United States Patent Office 3,509,124
Patented Apr. 28, 1970

3,509,124
MONOAZO DYESTUFF PIGMENTS
Karl Ronco and Willy Mueller, Riehen, and Paul Mueller, Basel, Switzerland, assignors to Ciba Limited, Basel, Switzerland, a company of Switzerland
No Drawing. Filed Dec. 13, 1966, Ser. No. 601,351
Claims priority, application Switzerland, Dec. 17, 1965, 17,481/65
Int. Cl. C07c *107/08;* C09b *29/20*
U.S. Cl. 260—203          9 Claims

ABSTRACT OF THE DISCLOSURE

Monoazo-dyestuffs of the formula:

(1)
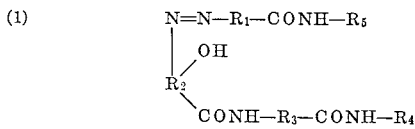

in which $R_1$ is a benzene radical, $R_2$ is a naphthalene radical, $R_3$ is a phenylene or diphenylene radical and $R_4$ and $R_5$ are each hydrogen or an aryl radical free from benzoylamine groups.

---

The present invention provides monoazo-dyestuff pigments of the formula (1)
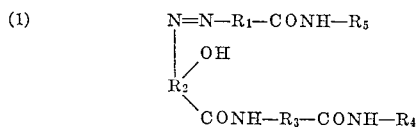

in which $R_1$ represents a benzene radical in which the —CONH— group is in meta-position relative to the azo bridge, $R_2$ represents a naphthalene residue in which the azo, hydroxyl and carboxylic acid amide group are in the 1,2,3-position, $R_3$ represents a phenylene or diphenylene radical, $R_4$ and $R_5$ each represents a hydrogen atom or an aryl radical that is free from benzoylamine groups.

The present invention also provides a process for the manufacture of monoazo-dyestuff pigments of the above Formula 1 which comprises (a) condensing a carboxylic acid halide of the formula (2)
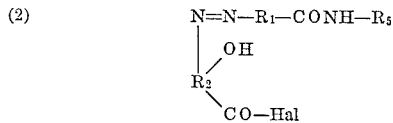
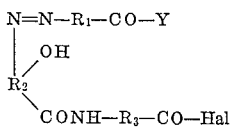

with an amine of the formula (3)          $H_2N—R_3—CONH—R_4$ or (b) condensing a carboxylic acid halide of the formula

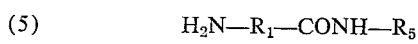
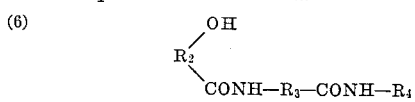

in which Y represents a halogen atom or the residue —NH—$R_5$, with ammonia or an arylamine that is free from benzoylamino groups; or (c) coupling the diazo compound of an amine of the formula (5)          $H_2N—R_1—CONH—R_5$ with a naphthol of the formula (6)          
$$\begin{array}{c} OH \\ R_2 \\ \diagdown CONH—R_3—CONH—R_4 \end{array}$$

Especially valuable dyestuffs are obtained by using as the starting material a carboxylic acid chloride of the formula (7)
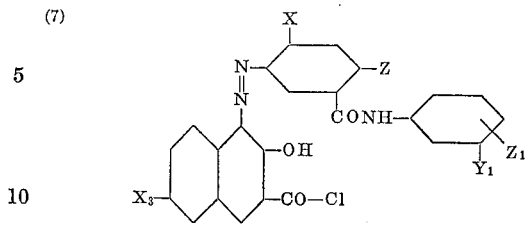

in which X represents a halogen atom or an alkyl, alkoxy, phenoxy or carbalkoxy group, Z represents a hydrogen or a halogen atom, $X_1$ represents a hydrogen or a halogen atom, or an alkyl, alkoxy, phenoxy or carbalkoxy group, $Y_1$ and $Z_1$ each stands for a hydrogen or a halogen atom or an alkyl, alkoxy, or trifluoromethyl group, and $X_3$ for a hydrogen or a halogen atom or an alkoxy group.

The carboxylic acids from which the halides of the Formula 2 are derived may be obtained by coupling the diazo compound of an amine of the formula (5)          $H_2N—R_1—CONH—R_5$

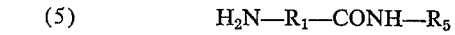

(in which $R_1$ and $R_5$ have the meanings defined above) with a 2,3-hydroxynaphthoic acid. The latter acid may, if desired, be substituted in the benzene ring that is free from carboxylic acid group, for example by a halogen atom, especially a bromine atom, in the 6-position.

As examples of aminocarboxylic acid amides of the Formula 5 there may be mentioned:
4-chloro-3-aminobenzoic acid-2′,5′-dichloranilide,
4-chloro-3-aminobenzoic acid-3′-chloranilide,
4-chloro-3-aminobenzoic acid-2′-chloro-5′-trifluoromethylanilide,
4-chloro-3-aminobenzoic acid-3′-trifluoromethylanilide,
4-chloro-3-aminobenzoic acid-3′,5′-bis-trifluoromethylanilide,
4-chloro-3-aminobenzoic acid-2′,4′,5′-trichloranilide,
2,4-dichloro-3-aminobenzoic acid-2,5-dichloranilide,
2,4-dichloro-3-aminobenzoic acid-3′-trifluoromethylanilide,
2,4-dichloro-3-aminobenzoic acid-3′-chloranilide,
5-amino-4-methoxy-2-chlorobenzoic acid-3′-trifluoromethylanilide,
4-methyl-3-aminobenzoic acid-2′,5′-dichloranilide,
4-methyl-3-aminobenzoic acid-3′-trifluoromethylanilide,
4-methoxy-3-aminobenzoic acid-3′-chloranilide,
4-methoxy-3-aminobenzoic acid-2′,5-dichloranilide,
4-methoxy-3-aminobenzoic acid-2′,4′,5′-trichloranilide,
4-methoxy-3-aminobenzoic acid-3′-trifluoromethylanilide,
4-methoxy-3-aminobenzoic acid-3′,5′-bis-trifluoromethylanilide,
4-methoxy-3-aminobenzoic acid-2′-chloro-5′-trifluoromethylanilide,
4-methoxy-3-aminobenzoic acid-2′,5′-dimethoxy-4′-chloranilide,
4-methoxy-3-aminobenzoic acid-2′,5′-dimethyl-4′-chloranilide,
4-methoxy-3-aminobenzoic acid acid-α-napthylamide,
4-methoxy-3-aminobenzoic acid-β-naphthylamide and
4-methoxy-3-aminobenzoic acid-(5′,8′-dichloro)-α-naphthylamide.

The resulting azo-dyestuff carboxylic acid is treated with a reagent capable of converting a carboxylic acid into its halide, for example the chloride or bromide, especially with a phosphorus halide, for example, phosphorus bromide or trichloride or pentachloride, phosphorus oxyhalide and preferably with thionylchloride.

The treatment with the acid-halogenating reagent is advantageously carried out in an inert organic solvent, for example, a chlorobenzene, for example, monochlorobenzene or dichlorobenzene, toluene, xylene or nitrobenzene.

In the manufacture of the carboxylic acid halides it is as a rule advantageous first to dry the azo-carboxylic acid which has been prepared in an aqueous medium or to dehydrate it by azeotropic distillation in an organic solvent. If desired, this azeotropic drying may be carried out immediately prior to the treatment with the acid-halogenating agent.

The resulting azo-dyestuff carboxylic acid halide is condensed with a primary amine of the Formula 3 preferably an amine of the formula

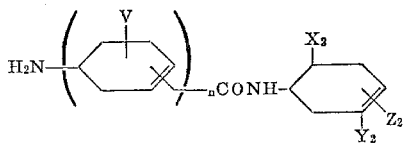

in which V represents a hydrogen or a halogen atom or an alkyl, alkoxy, phenoxy, carbalkoxy or alkylmercapto group, $X_2$ represents a hydrogen or a halogen atom or an alkyl, alkoxy, phenoxy or a carbalkoxy group, $Y_2$ and $Z_2$ each represents a hydrogen or a halogen atom, or an alkyl, alkoxy or a trifluoromethyl or lower alkanoylamino group and $n$ is 1 or 2, especially an amine of the formula

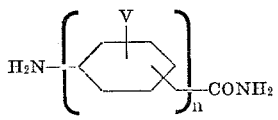

in which $n$ is 1 or 2 and V is as defined above: such amines may be obtained by condensing a halide of a para- or meta-nitrobenzoic acid, for example, the 3- or 4-nitrobenzoic acid, the 3-methyl-4-nitrobenzoic acid, 4-methyl-3-nitrobenzoic acid, 4-chloro-3-nitrobenzoic acid, 4-methoxy-3-nitrobenzoic acid or 4'-nitrodiphenyl-4-carboxylic acid, with ammonia or an arylamine, especially one of the formula

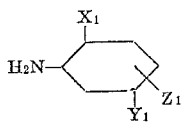

in which $X_1$, $Y_1$ and $Z_1$ have the meanings defined above, followed by reduction of the resulting nitroarylcarboxylic acid arylide to the amine.

Thus the present invention especially provides monoazo dyestuffs of the formula

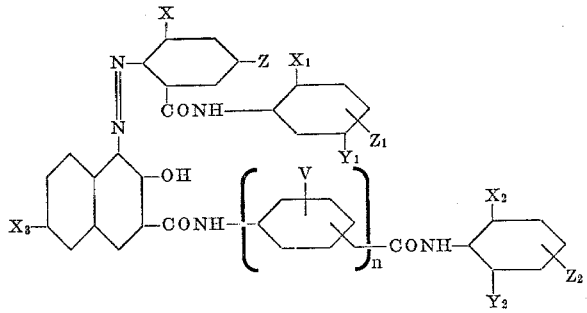

in which V represents a hydrogen or a halogen atom or an alkyl, alkoxy, phenoxy, carbalkoxy or alkylmercapto group, X represents a halogen atom or an alkyl, alkoxy, phenoxy or carbalkoxy group, Z stands for a hydrogen or a halogen atom, $X_1$ for a hydrogen or a halogen atom or an alkyl, alkoxy, phenoxy or carbalkoxy group, $Y_1$ and $Z_1$ each represents a hydrogen or a halogen atom or an alkyl, alkoxy or trifluoromethyl group, $X_3$ represents a hydrogen or a halogen atom or an alkoxy group, $X_2$ represents a hydrogen or a halogen atom or an alkyl, alkoxy, phenoxy or carbalkoxy group, $Y_2$ and $Z_2$ each represents a hydrogen or a halogen atom or an alkyl, alkoxy, or trifluoromethyl group, and $n$ is 1 or 2, or monoazo dyestuffs of the formula

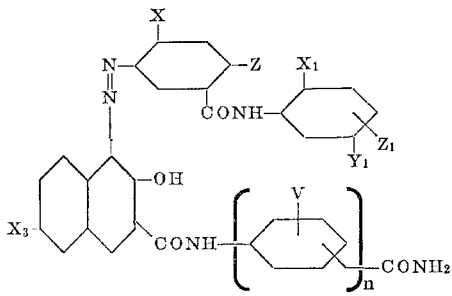

in which V, X, Z, $X_1$, $Z_1$, $Y_1$, $X_3$ and $n$ have the meanings given above.

As examples of primary amines used as starting materials the following arylamines may be mentioned: aniline, 2-, 3- or 4-chloraniline, 2-chloro-4-methylaniline, 2-chloro-4-methoxyaniline, 2,4-dichloraniline, 2,5-dichloraniline, 2,5-dibromaniline, 2,4,5-trichloraniline, 2-chloro-5-methylaniline, 2-chloro-5-methoxyaniline, 2,4-dimethylaniline, 2-methyl-4-chloraniline, 2-methyl-4-methoxyaniline, 2-methyl-5-chloraniline, 2-methyl-5-methoxyaniline, 2-methoxy-4-chloraniline, 2-methoxy-4-methylaniline, 2-methoxy-5-chloraniline, 2-methoxy-5-methylaniline, 2-methoxy-4-chloro-5-methylaniline, 3-trifluoromethylaniline, 2-chloro-5-trifluoromethylaniline, 2,4-dichloro-5-trifluoromethylaniline, 4-chloro-2-trifluoromethylaniline, 2-methoxy-5-trifluoromethylaniline, 2-phenoxy-5-trifluoromethylaniline, 2,5-bis-trifluoromethylaniline, 3-aminobenzoic acid methyl ester, 2-amino-5-chlorobenzoic acid methyl ester, 4-aminobenzoic acid methyl ester, 1- or 2-naphthylamine and 5,8-dichloro-1-aminonaphthalene.

The method (c) of the present process gives new dyestuffs when the diazo compound of an aminobenzene of the Formula 5 is coupled with a naphthol of the Formula 6.

The coupling component of the Formula 6 may be obtained by condensing a 2,3-hydroxynaphthoic acid halide with an amine of the Formula 3. The coupling reaction is carried out by gradually adding the aqueous alkaline solution of the coupling component to the acid solution of the diazonium salt. The proportion of alkali metal hydroxide to be used to dissolve the coupling component is advantageously chosen so that it is sufficient just to neutralize the mineral acid liberated from the diazonium salt during the coupling reaction. The reaction is advantageously carried out at a pH value within the range of from 4 to 6, which is advantageously adjusted by adding a buffer. Suitable buffers are, for example, the salts, especially the alkali metal salts, of formic, phosphoric or especially acetic acid. The alkaline solution of the coupling component advantageousy contains a wetting agent, a dispersant or an emusifier, for example, an aralkylsulphonate, for example, dodecylbenzenesulphonate or the sodium salt of 1,1'-naphthylmethanesulphonic acid; polycondensation products of alkylene oxides, for example, the reaction product of ethylene oxide with para-tertiary octylphenol; also alkyl esters of sulphoricinoleates, for example, n-butylsulphoricinoleates. The dispersion of the coupling component may advantageously also contain protective colloids, for example, methylcelluose, or a small proportion of an inert organic solvent that is sparingly soluble or insoluble in water, for example, halogenated or nitrated aromatic hydrocarbons, for example, benzene, toluene, xylene, chlorobenzene, dichlorobenzenes or nitrobenzene; also aliphatic halogenated hydrocarbons, for example, carbon tetrachloride or trichlorethylene; also water-miscible organic solvents, for example, acetone, methylethylketone, methanol, ethanol or isopropanol.

Alternatively the coupling reaction may be carried out by continuously mixing an acid solution of the diazonium salt with an alkaline solution of the coupling component inside a mixing nozzle, whereby immediate coupling of the components is brought about. It must be ensured that the diazo component and the coupling component are present inside the mixing nozzle in equimolecular proportions; a slight excess of coupling component may prove advantageous. In the simplest manner this is achieved by checking the pH value of the liquid inside the mixing nozzle. Moreover, it must be ensured that the solutions are well whirled inside the mixing nozzle. The resulting dyestuff dispersion is continuously withdrawn from the mixing nozzle and the dyestuff is filtered off.

The new dyestuffs are valuable pigments suitable for a wide variety of pigment applications, for example, in a finely dispersed form for colouring rayon and viscose or cellulose ethers and esters or superpolyamides, superpolyurethanes or polyesters in the spinning solution, as well as for the manufacture of coloured lacquers or lake formers, solutions or products from acetylcellulose, nitrocellulose, natural and synthetic resins, for example, polymerization or condensation resins, for example aminoplasts, alkyl resins, phenoplasts, polyolefines, for example, polystyrene, polyvinylchloride, polyethylene, polypropylene, polyacrylonitrile, rubber, casein, silicone and silicone resins. They are also advantageously used in the manufacture of colour pencils, cosmetics or laminated panels.

The following examples illustrate the invention. Unless otherwise indicated, parts and percentages are by weight.

EXAMPLE 1

30.9 grams of the dyestuff, obtained by coupling 4-chloro - 3 - aminobenzoic acid - (2′,5′ - dichloro)-anilide diazotized with sodium nitrite in aqueous hydrochloric acid, with 2,3-hydroxynaphthoic acid, are stirred for 2 hours at 120° to 125° C. in a mixture of 800 parts of ortho-dichlorobenzene, 1.2 parts of dimethylformamide and 10 parts of thionylchloride. When the reaction mixture has cooled, the precipitated crystalline monocarboxylic acid chloride of the dystuff is filtered off, washed with a small quantity of cold ortho-dichlorobenzene and benzene, and dried under vacuum at 60 to 70° C.

A mixture of 5.35 parts of the above chloride, 2.3 parts of 4-aminobenzoic acid anilide and 180 parts of ortho-dichlorobenzene is heated for 12 hours at 140 to 145° C. The crystalline, sparingly soluble pigment is filtered off hot, washed with hot ortho-dichlorobenzene, methanol and hot water, and dried under vacuum at 70 to 80° C.

The dyestuff of the formula

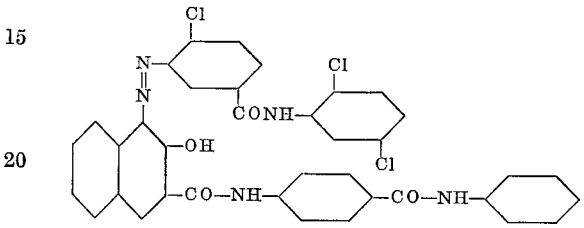

is a red pigment which is sparingly soluble to insoluble in the conventional solvents; it colours polyvinylchloride foils a scarlet shade which is very fast to light and migration.

In the same manner as described above in the first and second paragraphs the azo-dyestuff monocarboxylic acids obtained from the dinuclear diazo components of Column I and the coupling components of Column II of the following table may be reacted via the monoazo-dyestuff monocarboxylic acid chlorides with 1 mol of the dinuclear aromatic monamines shown in Column III. In Column IV the shade of the polyvinylchloride foils obtained with the new pigments is shown.

| | I | II | III | IV |
|---|---|---|---|---|
| 1 | 4-chloro-3-aminobenzoic acid-(2′,5′-dichloro)-anilide. | 2,3-hydroxynaphthoic acid | 4-aminobenzoic acid-(4′-acetylamino)-anilide. | Scarlet. |
| 2 | do | do | 4-aminobenzoic acid-(2′-chloro-5′-trifluoromethyl)-anilide. | Red. |
| 3 | do | do | 4-aminobenzoic acid-(2′-chloro-5′-carbomethoxy)-anilide. | Red orange. |
| 4 | do | do | 4-aminobenzoic acid-(2′,4′-dichloro)-anilide | Orange. |
| 5 | do | do | 4-aminobenzoic acid-(2′-5′-dichloro)-anilide | Do. |
| 6 | do | do | 4-aminobenzoic acid-(2′,4′,5′-trichloro)-anilide | Do. |
| 7 | do | do | 4-aminobenzoic acid-(2′-methoxy-5′-chloro)-anilide. | Red. |
| 8 | do | do | 4-aminobenzoic acid-(4′-carbomethoxy)-anilide. | Scarlet. |
| 9 | do | do | 4-aminobenzoic acid-(2′-methyl-5′-carbomethoxy)-anilide. | Red orange. |
| 10 | do | do | 4-aminobenzoic acid-(4′-chloro)-anilide | Red. |
| 11 | do | do | 4-aminobenzoic acid-(3′-trifluoromethyl)-anilide. | Orange. |
| 12 | do | do | 4-aminobenzoic acid-(4′-methoxy)-anilide | Red. |
| 13 | do | do | 4-amino-3-methylbenzoic acid-(2′-chloro-5′-trifluoromethyl)-anilide. | Orange. |
| 14 | do | do | 4-amino-2-chlorobenzoic acid-(2′-chloro-5′-trifluoromethyl)-anilide. | Scarlet. |
| 15 | 2,4-dichloro-5-aminobenzoic acid-(2′,4′-dichloro)-anilide. | do | 4-aminobenzoic acid-(2′-methoxy-5′-chloro)-anilide. | Red. |
| 16 | do | do | 4-aminobenzoic acid-(2′,4′,5′-trichloro)-anilide | Scarlet. |
| 17 | do | do | 4-aminobenzoic acid-(2′-chloro-5′-trifluoromethyl)-anilide. | Do. |
| 18 | do | do | 4-aminobenzoic acid-(2′-chloro-5′-carbomethoxy)-anilide. | Do. |
| 19 | do | do | 4-amino-3-methylbenzoic acid-(2′-chloro-5′-trifluoromethyl)-anilide. | Do. |
| 20 | 2,4-dichloro-5-amino-benzoic acid-(2′,5′-dichloro)-anilide. | do | 4-aminobenzoic acid-(2′-chloro-5′-carbomethoxy)-anilide. | Do. |
| 21 | do | do | 4-aminobenzoic acid-(2′,4′-dichloro)-anilide | Do. |
| 22 | do | do | 4-aminobenzoic acid-(2′,5′-dichloro)-anilide | Do. |
| 23 | do | do | 4-aminobenzoic acid-(2′-chloro-5′-trifluoromethyl)-anilide. | Do. |
| 24 | do | do | 4-aminobenzoic acid-(4′-chloro)-anilide | Red. |
| 25 | do | do | 4-aminobenzoic acid-(3′-trifluoromethyl)-anilide. | Red. |
| 26 | 2,4-dichloro-5-aminobenzoic acid-(2′,4′,5′-trichloro)-anilide. | do | 4-aminobenzoic acid-(4′-methoxy)-anilide | Red. |
| 27 | do | do | 4-aminobenzoic acid-(2′-chloro-5′-trifluoromethyl)-anilide. | Scarlet. |
| 28 | do | do | 4-aminobenzoic acid anilide | Do. |
| 29 | do | do | 4-aminobenzoic acid-(4′-chloro)-anilide | Red. |
| 30 | do | do | 4-aminobenzoic acid-(3′-trifluoromethyl)-anilide. | Red. |
| 31 | 4-methyl-3-aminobenzoic acid-(2′-chloro-5′-trifluoromethyl)-anilide. | do | 4-aminobenzoic acid-(4′-methoxy)-anilide | Red. |
| 32 | do | do | 4-aminobenzoic acid anilide | Red. |
| 33 | do | do | 4-aminobenzoic acid-(4′-chloro)anilide | Red. |

| | I | II | III | IV |
|---|---|---|---|---|
| 34 | 4-chloro-3-aminobenzoic acid-(2',5'-dichloro)-anilide. | do | 4-chloro-3-aminobenzoic acid-(2'-chloro-5'-trifluoromethyl)-anilide. | Orange. |
| 35 | do | do | 4-methoxy-3-aminobenzoic acid anilide | Scarlet. |
| 36 | do | do | 3-aminobenzoic acid-(2',5'-dichloro)-anilide | Do. |
| 37 | do | do | 2,4-dichloro-5-aminobenzoic acid anilide | Do. |
| 38 | do | do | 4-methoxy-3-aminobenzoic acid-(3'-trifluoromethyl)-anilide. | Red. |
| 39 | do | do | 4-chloro-3-aminobenzoic acid-(3',5'-ditrifluoromethyl)-anilide. | Scarlet. |
| 40 | do | do | 2,4-dichloro-5-aminobenzoic acid-(2',4',5'-trichloro)anilide. | Do. |
| 41 | 4-chloro-3-aminobenzoic acid-(2',4'-dichloro)-anilide. | do | 4-aminodiphenyl-4'-carbonamide | Do. |
| 42 | do | do | 4-aminodiphenyl-4'-carboxylic acid anilide | Yellowish red. |
| 43 | do | do | 4-aminodiphenyl-4'-carboxylic acid-(2'',5''-dichloro)-anilide. | Orange. |
| 44 | do | do | 4-aminodiphenyl-4'-carboxylic acid-(2''-chloro-5''-trifluoromethyl)-anilide. | Do. |
| 45 | do | do | 4-aminodiphenyl-4'-carboxylic acid-(2''-methyl)-anilide. | Do. |
| 46 | do | do | 4-aminodiphenyl-4'-carboxylic acid-(2'',4'',5''-trichloro)-anilide. | Do. |
| 47 | 4-chloro-3-aminobenzoic acid-(2',4-'dichloro)-anilide. | do | 4-aminodiphenyl-4'-carboxylic acid-(2''-naphthyl)-amide. | Scarlet. |
| 48 | 4-chloro-3-aminobenzoic acid-(2'-chloro-5'-trifluoromethyl)-anilide. | do | 4-aminodiphenyl-4'-carboxylic acid-(2'',5''-dimethyl)-anilide. | Do. |
| 49 | 4-methyl-3-aminobenzoic acid-(2'',5''-dichlor)-anilide. | do | 4-aminodiphenyl-4'-carboxylic acid-(2''-chloro-5''-trifluoromethyl)-anilide. | Yellowish red. |
| 50 | 4-chloro-3-aminobenzoic acid-(2'',4'',5''-trichlor)-anilide. | do | 4-aminodiphenyl-4'-carboxylic acid-(2''-methyl)-anilide. | Red. |
| 51 | do | do | 4-aminodiphenyl-4'-carboxylic acid-(2'',5''-dimethyl)-anilide. | Scarlet. |
| 52 | do | do | 4-aminodiphenyl-4'-carboxylic acid-(2''-methoxy)-anilide. | Red. |
| 53 | do | do | 4-aminodiphenyl-4'-carboxylic acid-(1''-naphthyl)-amide. | Red. |
| 54 | 4-bromo-3-aminobenzoic acid-(2'',4'',5''-trichlor)-anilide. | do | 4-aminodiphenyl-4'-carboxylic acid-(2''-naphthyl)-amide. | Red. |
| 55 | 4-carbomethoxy-3-aminobenzoic acid anilide | do | 4-aminodiphenyl-4'-carboxylic acid anilide | Red. |
| 56 | 4-phenoxy-3-aminobenzoic acid anilide | do | 4-aminodiphenyl-4'-carboxylic acid anilide | Scarlet. |
| 57 | 4-chloro-3-aminobenzoic acid-(2',4'-dichlor)-anilide. | 6-bromo-2,3-hydroxy naphthoic acid. | do | Red. |
| 58 | do | 6-methoxy-2,3-hydroxy-naphthoic acid. | do | Ruby. |
| 59 | 4-carbomethoxy-(3-aminobenzoic acid-3'-trifluoromethyl)-anilide. | 2,3-hydroxynaphthoic acid | 4-amino-3-methylbenzoic acid-(2',5'-dichloro)-anilide. | Scarlet. |
| 60 | 4-methoxy-3-aminobenzoic acid-(3'-trifluoromethyl)-anilide. | do | do | Red. |
| 61 | 4-methylenemercapto-3-aminobenzoic acid-(3'trifluoromethyl)-anilide. | | 4-aminobenzoic acid-(2'-chloro-5'-trifluoromethyl)-anilide. | Red. |
| 62 | 4-chloro-3-aminobenzoic acid-(2'-methyl-4'-chlor)-anilide. | do | 4-aminodiphenyl-4'-carboxylic acid-(2'',5''-dichlor)-anilide. | Orange. |
| 63 | 4-methyl-3-aminobenzoic acid-(2'-chloro-5'-trifluoromethyl)-anilide. | do | 4-aminodiphenyl-4'-carbonamide | Bluish red. |
| 64 | do | do | 4-aminodiphenyl-4'-carboxylic acid-(4''-methoxy)-anilide. | Do. |
| 65 | do | do | 4-aminodiphenyl-4'-carboxylic acid-(4''-acetylamino)-anilide. | Do. |
| 66 | do | do | 4-aminodiphenyl-4'-carboxylic acid anilide | Do. |
| 67 | 4-chloro-3-aminobenzoic acid-(2'-methyl-3'-chlor)-anilide. | do | 4-aminodiphenyl-4'-carboxylic acid-(2'',5''-dichlor)-anilide. | Orange. |
| 68 | do | do | 4-aminodiphenyl-4'-carboxylic acid-(2'',4'',5''-trichlor)-anilide. | Do. |
| 69 | do | do | 4-aminodiphenyl-4'-carboxylic acid-(3''-trifluoromethyl)-anilide. | Do. |
| 70 | do | do | 4-aminodiphenyl-4'-carboxylic acid-(2''-chloro-5''-trifluoromethyl)-anilide. | Reddish orange. |
| 71 | 4-chloro-3-aminobenzoic acid-(2',5'-dichlor)-anilide. | do | 4-amino-3-methylbenzoic acid anilide | Orange. |
| 72 | do | do | 4-amino-3-methylbenzoic acid-(2',5'-dichlor)-anilide. | Do. |
| 73 | do | do | 4-amino-3-methylbenzoic acid-(2'-chloro-5'-trifluoromethyl)-anilide. | Do. |
| 74 | 4-methoxy-3-aminobenzoic acid-(2',5'-dichlor)-anilide. | do | 4-amino-3-methylbenzoic acid-(4'-chlor)-anilide. | Claret. |
| 75 | do | do | 4-aminobenzoic acid amide | Do. |
| 76 | do | do | 4-amino-3-methylbenzoic acid amide | Do. |
| 77 | 4-methyl-3-aminobenzoic acid-(2',5'-dichlor)-anilide. | do | 4-amino-3-methylbenzoic acid-(2',4'-dichlor)-anilide. | Orange. |
| 78 | 4-chloro-3-aminobenzoic acid-(2'-chloro-5'-trifluoromethyl)-anilide. | do | 4-aminodiphenyl-(4'-carboxylic acid)-anilide | Do. |
| 79 | do | do | 4-aminodiphenyl-4'-carboxylic acid-(2'',4'',5''-trichlor)-anilide. | Do. |
| 80 | do | do | 4-aminodiphenyl-4'-carboxylic acid-(2''-chloro-5''-trifluoromethyl)-anilide. | Scarlet. |
| 81 | 4-methyl-3-aminobenzoic acid-(3'-trifluoromethyl)-anilide. | do | 4-aminodiphenyl-4'-carboxylic acid-(4''-methoxy)-anilide. | Red. |
| 82 | 4-methoxy-3-amino-benzoic acid-(2',5'-dichlor)-anilide. | do | 4-aminodiphenyl-4''carboxylic acid-(4''-methyl)-anilide. | Bluish red. |

EXAMPLE 2

23.7 parts of 4-chloro-3-aminobenzoic acid-(2',5'-dichlor)anilide are suspended in 45 parts of glacial acetic acid, stirred into a mixture of 30 parts of hydrochloric acid of 30% strength and 100 parts of ice water, then diazotized at 0 to 5° C. with 20 parts of 4 N-sodium nitrite solution and clarified by filtration.

Separately, a solution is prepared in the cold of 39.6 parts of 3 - methyl - 4 - (2'-hydroxy-3'-naphthoylamino)-benzoic acid-(2''-chloro-3''-trifluoromethyl)-anilide in a mixture of 80 parts of ethyleneglycol monoethyl ether and 66 parts of sodium hydroxide solution of 30% strength. The two solutions—if necessary after dilution with water—are continuously supplied to a mixing nozzle in which the components undergo immediate coupling. By regulating the supply the pH value within the mixing nozzle is kept between 5 and 6. The temperature should be maintained between 35 and 40° C., which can be achieved by adding water to the solutions of the components. The resulting dyestuff suspension is filtered and the filter residue washed, then stirred with a mixture of 20 parts of water, 110 parts of ethyleneglycol monoethyl ether and 100 parts of ortho-dichlorobenzene, and the whole is filtered. The filter residue is washed with ethyleneglycol monoethyl ether and then with methanol, and dried under vacuum at 70 to 80° C. The dyestuff is obtained in a substantially quantitative yield; insofar as shade, purity, fine dispersion and fastness properties are concerned it equals the product No. 13 of the table, obtained as described in Example 1.

A particularly fine dispersion of the dyestuff formed is obtained by adding to the solution of the diazo component or of the coupling component an anionic or nonionic wetting agent, for example the sodium salt of N-benzyl-μ-heptadecylbenzimidazole disulphonic acid.

EXAMPLE 3

31.6 parts of 4-chloro-3-aminobenzoic acid-(2′,5′-dichlor)anilide are diazotized as described in Example 2.

Separately, a solution is prepared of 49 parts of 3-methyl - 4-(2′-hydroxy-3′-naphthoylamino)-benzoic acid-(2″-chloro-5″-trifluoromethyl)-anilide in 100 parts of ethanol, 10 parts of sodium hydroxide solution of 30% strength, 200 parts of water and 150 parts of ethyleneglycol monoethyl ether. This solution is mixed with 1 part of the condensation product from 8 mols of ethylene oxide with 1 mol of paratertiary octylphenol, whereupon the naphthol is precipitated cold with 100 parts of glacial acetic acid with thorough stirring. Coupling is performed by adding the diazo solution described in the first paragraph of this example, while keeping the pH value at 3 to 4 and the temperature at 0 to 10° C. To complete the coupling the whole is stirred for 2 hours while raising the temperature up to 40° C., and the resulting pigment suspension is rendered acid to Congo red with hydrochloric acid and filtered, washed with hot water until the filtrate no longer contains any chlorine ions, dried under vacuum at 80 to 90° C. and there is obtained a good yield of a red, softly granular powder which is very sparingly soluble in organic solvents. When rolled into polyvinylchloride foils, it colours them orange shades. The pigment colouring is very fast to migration, overstripe bleeding and light. The product obtained in this manner corresponds to the formula

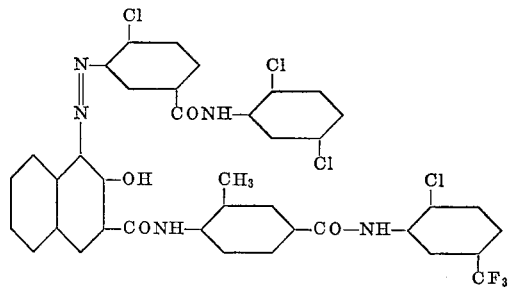

EXAMPLE 4

A mixture of 65 parts of stabilized polyvinylchloride, 35 parts of dioctylphthalate and 0.2 part of the dyestuff obtained in Example 1 is stirred and then rolled to and fro on a two-roll calender for 7 minutes at 140° C. The resulting scarlet foil has very good fastness to light and migration.

What is claimed is:

1. Monoazo-dyestuff pigments of the formula

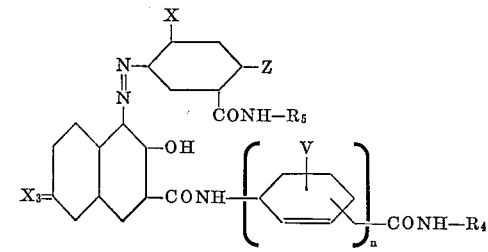

in which V represents a hydrogen or chloro atom, a lower alkyl, or lower alkoxy group, X represents a chloro or bromo atom or a lower alkyl, lower alkoxy, phenoxy or or lower carbalkoxy group , Z represents a hydrogen or a chloro atom, $R_4$ is selected from the group consisting of hydrogen and

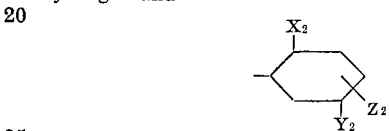

and $R_5$ is selected from the group consisting of hydrogen and

$X_1$ represents a hydrogen or a chloro atom, a lower alkyl or lower alkoxy group, $Y_1$ and $Z_1$ each represents a hydrogen or a chloro atom or a lower alkyl, lower alkoxy or a trifluoromethyl group, $X_3$ represents a hydrogen or bromo atom or a lower alkoxy group, $X_2$ represents a hydrogen or chloro atom, a lower alkyl or lower alkoxy group, $Y_2$ and $Z_2$ each represents a hydrogen or a chloro atom or a lower alkyl, lower alkoxy, lower alkanoylamino, lower carbalkoxy or a trifluoromethyl group, and $n$ is 1 or 2.

2. Monoazo-dyestuff pigments as claimed in claim 1 of the formula

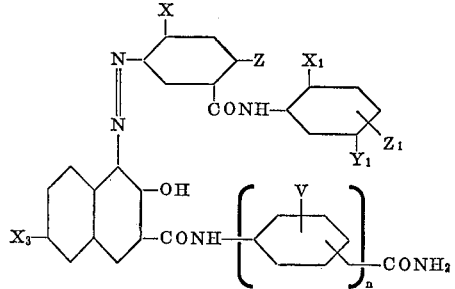

in which V, X, Z, $X_1$, $Z_1$, $Y_1$, $X_3$ and $n$ have the meanings defined in claim 1.

3. The dyestuff as claimed in claim 1 of the formula

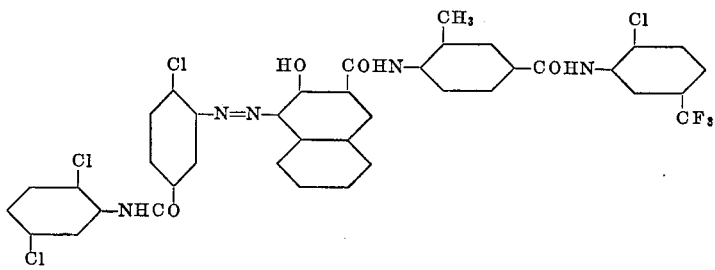

4. The dyestuff as claimed in claim 1 of the formula

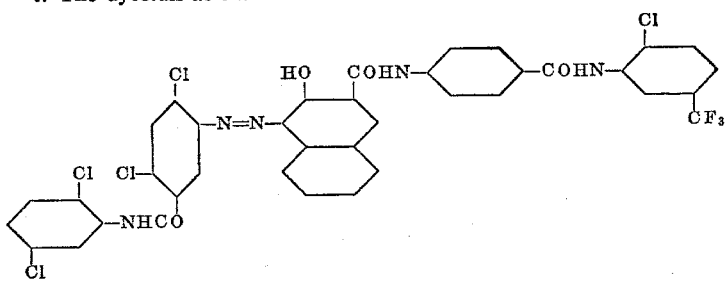

5. Monoazo-dyestuff pigments of the formula

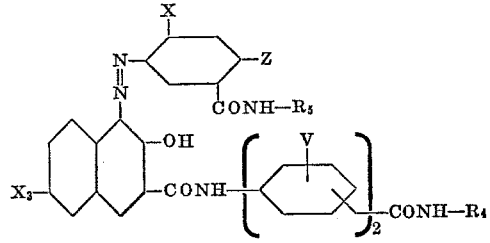

in which V is selected from the group consisting of hydrogen, chloro, lower alkyl and lower alkoxy, X is selected from the group consisting of chloro, bromo, lower alkyl, lower alkoxy, phenoxy and lower carbalkoxy, Z is selected from the group consisting of hydrogen and chloro, $R_4$ is selected from the group consisting of hydrogen and

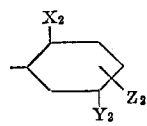

and $R_5$ is selected from the group consisting of hydrogen and

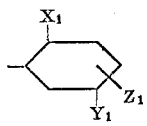

$X_1$ is selected from the group consisting of hydrogen, chloro, lower alkyl and lower alkoxy, $Y_1$ and $Z_1$ are each selected from the group consisting of hydrogen, chloro, lower alkyl, lower alkoxy and trifluoromethyl, $X_3$ is selected from the group consisting of hydrogen, bromo and lower alkoxy, $X_2$ is selected from the group consisting of hydrogen, chloro, lower alkyl and lower alkoxy, $Y_2$ and $Z_2$ each are selected from the group consisting of hydrogen, chloro, lower alkyl, lower alkoxy, lower alkanoylamino, lower carbalkoxy and trifluoromethyl.

6. The dyestuff as claimed in claim 5 of the formula

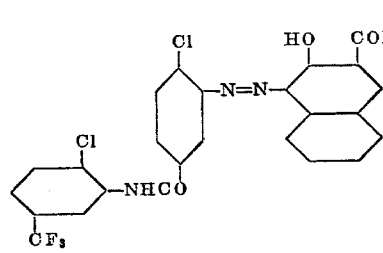

7. The dyestuff as claimed in claim 5 of the formula

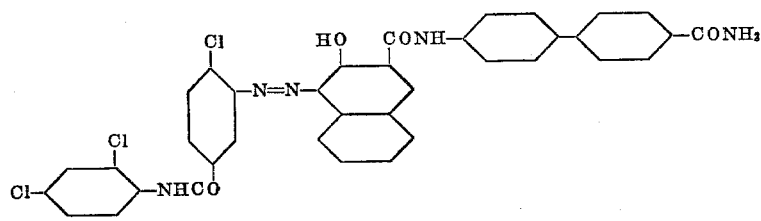

8. The dyestuff as claimed in claim 5 of the formula

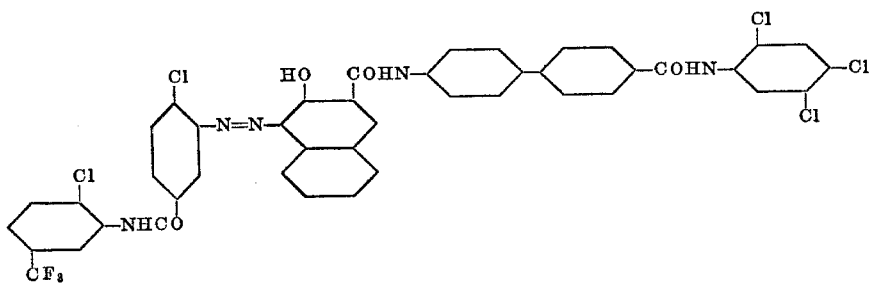

9. The dyestuff as claimed in claim 5 of the formula
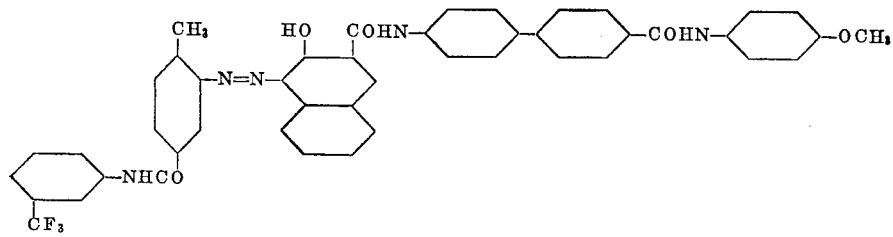
References Cited
UNITED STATES PATENTS
2,210,072    8/1940    Fischer _____ 260—203
3,366,623    1/1968    Ronco et al. _____ 260—203
CHARLES B. PARKER, Primary Examiner
C. F. WARREN, Assistant Examiner
U.S. Cl. X.R.
8—4, 5, 41, 50; 106—23, 288, 289; 260—204, 999

CASE 5833/E  D

PO-1050
(5/69)

UNITED STATES PATENT OFFICE
CERTIFICATE OF CORRECTION

Patent No. 3,509,124    Dated April 28, 1970

Inventor(s) Karl Ronco et al

It is certified that error appears in the above-identified patent and that said Letters Patent are hereby corrected as shown below:

Column 10, in the formula of claim 1

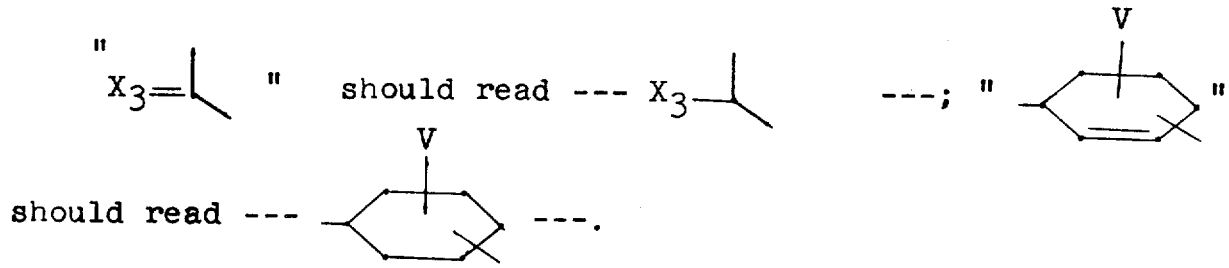

should read ---

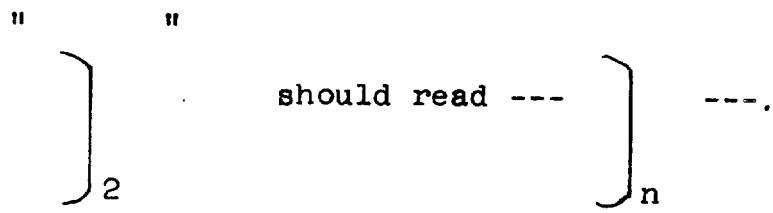

---.

Column 11, in the formula of claim 5

" ]₂ " should read --- ]ₙ ---.

Signed and sealed this 11th day of May 1971.

(SEAL)
Attest:

EDWARD M. FLETCHER, JR.          WILLIAM E. SCHUYLER, JR.
Attesting Officer                Commissioner of Patents